United States Patent
Wiedmann et al.

(10) Patent No.: US 6,272,760 B1
(45) Date of Patent: Aug. 14, 2001

(54) DAMPING DEVICE FOR A COORDINATE MEASURING EQUIPMENT

(75) Inventors: Wolfgang Wiedmann, Aalen; Carsten Würfel, Oberkochen; Eugen Aubele, Bühmenkirch, all of (DE)

(73) Assignee: Carl-Zeiss-Stiftung trading as Carl Zeiss (DE)

( * ) Notice: Subject to any disclaimer, the term of this patent is extended or adjusted under 35 U.S.C. 154(b) by 0 days.

(21) Appl. No.: 09/120,258

(22) Filed: Jul. 21, 1998

(30) Foreign Application Priority Data

Jun. 12, 1998 (DE) .......................................... 298 10 618 U

(51) Int. Cl.⁷ .................................................. G01B 5/004
(52) U.S. Cl. ................. 33/503; 33/710; 33/1 M
(58) Field of Search ............................. 33/503, 710, 1 M, 33/703

(56) References Cited

U.S. PATENT DOCUMENTS 5,909,938 * 6/1999 Brenner et al. ........................ 33/503

* cited by examiner

Primary Examiner—Christopher W. Fulton
Assistant Examiner—Lydia M. De Jesús

(57) ABSTRACT

A damping device for vibration damping of components of a coordinate measuring equipment has a damping component which is frictionally connected to the component to be damped. The characteristic frequency of the damping component deviates from the characteristic frequency of the component to be damped.

22 Claims, 1 Drawing Sheet

DAMPING DEVICE FOR A COORDINATE MEASURING EQUIPMENT

BACKGROUND OF THE INVENTION

1. Field of the Invention

The invention relates to a damping device and more particularly to a damping device for damping vibrations of components of a coordinate measuring equipment. Such damping devices are already well known in the state of the art.

2. Discussion of Relevant Art

For example, German Patent DD 140 079, representative of a whole series of further documents, shows a damping device for the traveling mechanism of the sensing head of a coordinate measuring equipment. A mass body, vibration-damped and resiliently mounted, is arranged at a suitable place in the concerned mechanism, as a damping device in order thereby to damp the vibrations which result from the movement of the concerned mechanism.

In such damping devices, it was assumed that whole groups of components, such as for example the mechanism, vibrate as a whole, and that by the use of corresponding damping devices at suitable places, the vibrations of the whole mechanism could be damped.

It has however been found that in specific constructions of the coordinate measuring equipment, vibrations can also be excited in individual components.

SUMMARY OF THE INVENTION

The present invention therefore has as its object to propose a damping device of the kind stated initially, with which individual components of a coordinate measuring equipment can also be selectively damped.

The object is attained by a damping device for vibration damping of components to be damped of a coordinate measuring equipment, comprising at least one damping component that is frictionally connected to a component to be damped and which has a characteristic frequency different from the characteristic frequency of the component to be damped.

The particular basic concept of our invention is that at least one additional damping component is provided whose characteristic frequency deviates from the characteristic frequency of the component to be damped, the two components being frictionally joined together.

Very different components of a coordinate measuring equipment can be concerned here. For example, the component to be damped could be part of the traveling mechanism of a coordinate measuring equipment. In a coordinate measuring equipment of the portal type, such components could be the column or the crosspiece of the portal mechanism. In a coordinate measuring equipment of the column type of construction, corresponding components could be the mechanism of the vertically-aligned column, or the measuring arm which projects horizontally from the column, on which it is movably guided. In the case of a coordinate measuring equipment of bridge construction, a possible component could be the bridge which spans the measuring table.

Although the damping device is preferably used for components in the traveling mechanism of the coordinate measuring equipment, it is of course not limited only to such components. For example, components on which the measuring table is mounted could be damped by a corresponding damping device.

For the production of the frictional connection, the two components are advantageously fastened against each other, so that the frictional connection is accomplished by the mutual abutment of the two components.

The frictional coefficient of the frictional connection between the component to be damped and the damping component can be varied by arranging a layer of material, which alters the coefficients of friction between the components, at least partially between the component to be damped and the damping component. The layer of material which varies the coefficients of friction could be a lacquer, for example. However, an adhesive tape can be particularly easily used, having its non-adhesive surface coated with a corresponding material. The adhesive tape is simply adhered either to the component to be damped or to the damping component, so that the non-adhesive side of the adhesive tape, on bracing the components, abuts on the respective other component, and thus varies the coefficient of friction between the components.

Numerous different variations are also conceivable for the embodiment of the form of the component to be damped and of the damping component. For example, the component to be damped could be a profile bar with a rectangular or other profile shape, and the damping component could be two hemicylindrical tube halves, with the one tube half abutting two side edges of the said rectangular profile and the other tube half abutting the other side edges of the profile. In a particularly advantageous embodiment, however, the component to be damped is formed as a tube. In this case, the damping component is likewise made in two parts, each of the two parts being embodied as an elongate angle profile, with its longitudinal edges respectively abutting on the tube.

The materials of which the component to be damped and the damping component are made can also be completely different. For example, the component to be damped can be of carbon fiber reinforce plastic and the damping component can be of aluminum. The components can of course also be made of other materials. For example, the component to be damped could be made of steel or aluminum. The damping component could be made of steel, for example.

A series of different means are also conceivable in order to fasten the component to be damped and at least one damping component against each other. For example, the component to be damped and the damping component could be fastened together by means of cable binders, tubular bands, wires, tubular shells, or with screws. In a particular simple embodiment, the component to be damped and the damping component are simply adhered together along the whole length by means of an adhesive tape.

BRIEF DESCRIPTION OF THE DRAWINGS

Further advantages and developments of the invention will become apparent from the description of the Figures which follows.

DETAILED DESCRIPTION OF PREFERRED EMBODIMENTS

Figure 1:
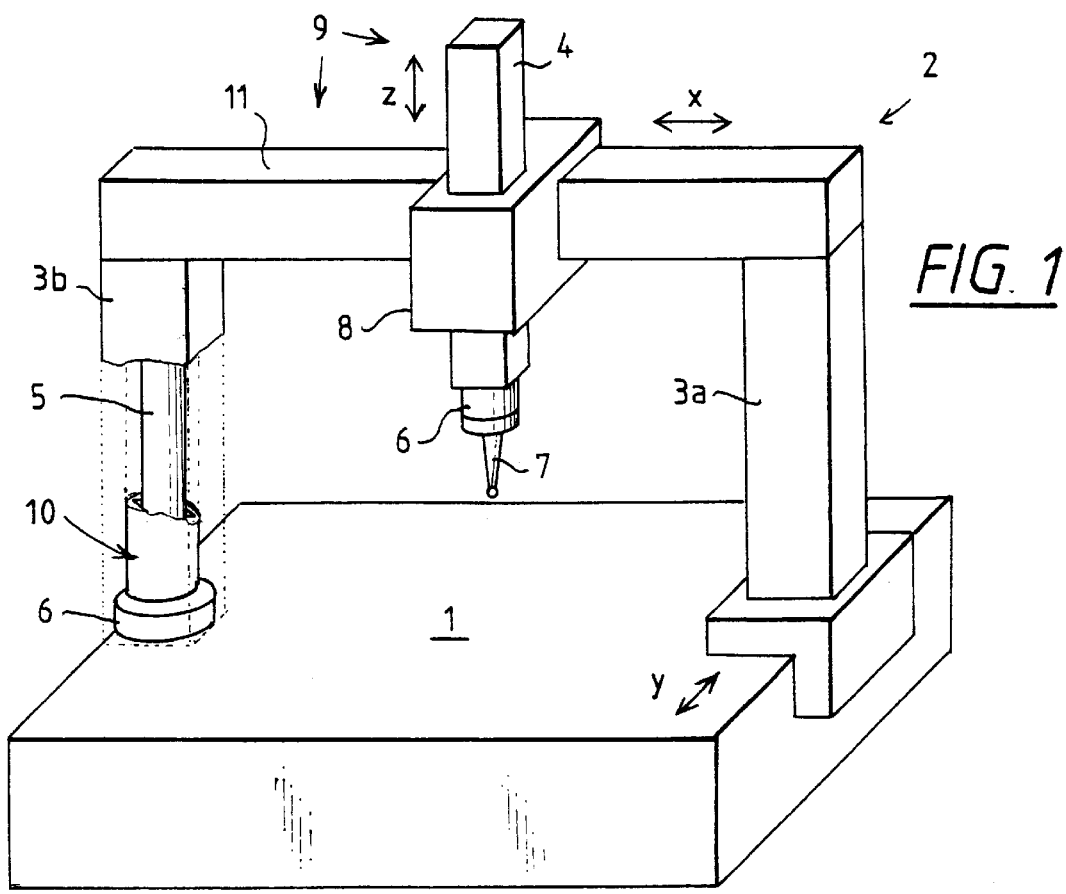
FIG. 1 shows a coordinate measuring equipment with a damped component (5)

FIG. 1 shows a coordinate measuring equipment of the so-called portal type, in which a measuring sensing head (6) with a sensor (7) attached to it can be caused to travel in the three coordinate directions (x, y, z) by means of a so-called portal mechanism. For this purpose, the portal mechanism has a portal (2) which can travel in the direction of the arrow (y), with a cross slide (8) which is movably guided along the crosspiece (11) of the portal (2) in the direction of the arrow (x), and on which, furthermore, a mandrel (4) is movably guided in the third coordinate direction which is indicated by the arrow (z). A workpiece to be measured can be correspondingly sensed with the sensor (7) which is attached to the measuring sensing head (6), in that the so-called sensor deflection, that is, the deflection of the sensor (7) with respect to the sensing head (6), is sensed by means of corresponding sensors in the sensing head. The measurement of the position of the sensing head (6) in the machine coordinate system, the so-called machine position, here takes place by means of corresponding scales (here likewise not shown in more detail) in the axes which are sensed by optical sensing units. The displacement of the said portal mechanism takes place by means of a drive, here likewise not shown. As can be seen in the left-hand region of the Figure, the cladding of the vertically aligned column (3b) of the portal mechanism (2) was shown broken away, so that the load-bearing component proper, which in this case is the component to be damped (5), namely a tube made of carbon plastic reinforced plastic, can be seen here, is supported by means of an air bearing (6) directly on the surface of the workpiece and is guided over it.

The column (3b) is here shown broken away, so that the damping device (10) which surrounds the component to be damped (5) can be seen only in a lower region. However, the damping device (10) surrounds the whole component to be damped (5) as far as the crosspiece (11). This is of course not obligatory; it could of course be that only a portion of the component to be damped (5) is surrounded by the damping device.

In trials with such a coordinate measuring equipment in which the component (5) was heretofore driven without the damping device according to the invention, it was found that the component (5), during processes of acceleration and braking, begins to vibrate in its characteristic vibration, so that it takes a very long time, during the sensing of a workpiece, until the portal mechanism (2) has come to rest. Only then is the pickup of a corresponding measurement value possible with sufficient accuracy, since until the vibration dies away, the measured sensor deflection and the measured machine position constantly vary due to the vibration. The damping device (10), only sectionally shown in FIG. 1, was therefore provided around the component (5), and by means of it the component (5) can be correspondingly damped. The damping device (10) will now be described in more detail with reference to FIG. 2.

Figure 2:
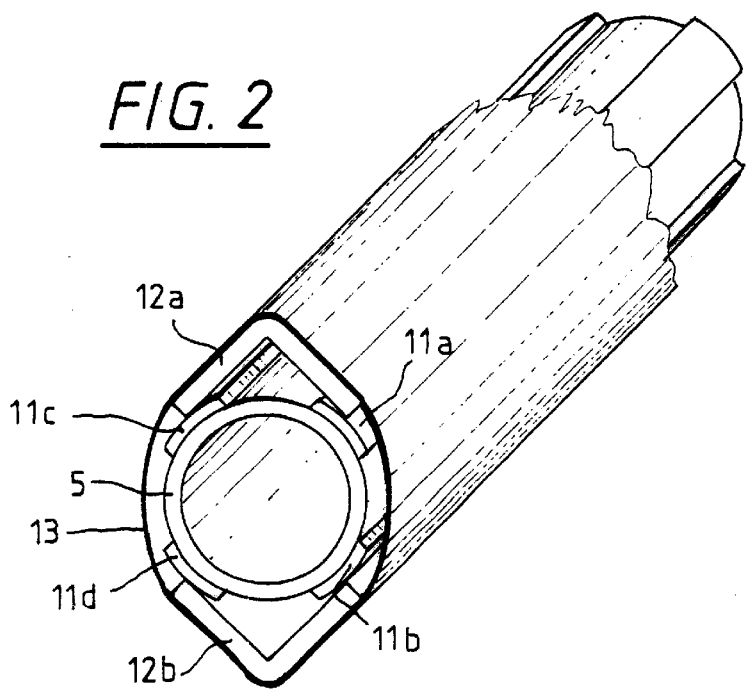
FIG. 2 shows a section through the damped component according to the invention according to FIG. 1.

As can be seen from FIG. 2, the component (5) is here completely surrounded by the damping device (10). The said damping device (10) in this case includes four adhesive tapes (11a–d) which are installed on the component (5) to be damped, which is constructed as a carbon fiber reinforced plastic tube. The adhesive tapes concerned, which are used purely by way of example here, are the so-called "non-slip tapes" such as are used for binding cable harnesses. These "non-slip tapes", when used as cable binders, prevent the cable slipping askew. A "non-slip tape" of this kind is obtainable from the company, Kager GmbH, in 60346 Frankfurt, Germany, under the designation Typ 111 202 ROT.

A respective said damping component in the form of an angle (12a, 12b) made of aluminum is located on a respective two of the said adhesive tapes (11a–c). In order to fasten the component to be damped, that is, the CFK tube, and the damping components (12a, 12b) together, the arrangement which is described is wrapped with a conventional adhesive tape (13), so that the damping components (12a, 12b) and the component to be damped (5) are fastened together.

It will be understood that the invention which is described here in connection with the embodiment example is not limited to the embodiment example shown. Numerous variations can of course be effected, as was stated in the introduction to the Specification.

We claim:

1. In combination, a damping device for vibration damping and a component (5) to be damped of a coordinate measuring equipment, comprising: at least one damping component (12a, 12b) that is solely frictionally connected to a component (5) to be damped, and which has a characteristic frequency different from the characteristic frequency of the component to be damped, wherein the frictional connection between said damping component and the component to be damped is determined by the coefficient of friction between said damping component and the component to be damped.

2. The damping device according to claim 1, wherein said damping component is frictionally connected with the component to be damped over nearly the whole length of the component to be damped.

3. The damping device according to claim 2, further comprising at least one fastening unit that frictionally connects said damping component to the component to be damped.

4. The damping device according to claim 3, wherein said fastening unit comprises an adhesive tape (13).

5. The damping device according to claim 1, further comprising at least one material layer in a restricted region between the component to be damped and said damping component, which alters the coefficient of friction between the component to be damped and said damping component.

6. The damping device according to claim 5, wherein said material layer comprises an adhesive tape (11a–d).

7. The damping device according to claim 1, wherein said damping component is arranged to damp the component to be damped that comprises a tube.

8. The damping device according to claim 7, wherein said damping component is arranged to damp the component to be damped that comprises a carbon fiber reinforced plastic tube.

9. The damping device according to claim 1, wherein said damping component comprises an angle profile.

10. The damping device according to claim 9, wherein said angle profile is comprised of aluminum.

11. The damping device according to claim 1, wherein said damping component is arranged to damp the component to be damped that comprises a portion of a column of a portal of a coordinate measuring equipment.

12. A coordinate measuring equipment for measurement of workpieces, comprising at least one component of the coordinate measuring equipment that is damped by a damping device, said damping device comprising at least one damping component that is solely frictionally connected to the component to be damped and having a characteristic frequency that deviates from the characteristic frequency of the component to be damped, wherein the frictional connection between said damping device and the component to be damped is determined by the coefficient of friction between said damping device and the component to be damped.

13. The coordinate measuring equipment according to claim 12, wherein the component to be damped is elongated and frictionally connected over nearly its whole length with said dampening component.

14. The coordinate measuring equipment according to claim 12, further comprising at least one fastening unit that frictionally connects said damping component to the component to be damped.

15. The coordinate measuring equipment according to claim 14, wherein said fastening unit comprises an adhesive tape (13).

16. The coordinate measuring equipment according to claim 12, further comprising at least one material layer in a restricted region between the component to be damped and said damping component, which alters the coefficient of friction between the component to be damped and said damping component.

17. The coordinate measuring equipment according to claim 16, wherein said material layer comprises an adhesive tape (11a–d).

18. The coordinate measuring equipment according to claim 12, wherein said damping component is arranged to damp the component to be damped that comprises a tube.

19. The coordinate measuring equipment according to claim 18, wherein said damping component is arranged to damp the component to be damped that comprises a carbon fiber reinforced plastic tube.

20. The coordinate measuring equipment according to claim 12, wherein said damping component comprises an angle profile.

21. The coordinate measuring equipment according to claim 20, wherein said angle profile is comprised of aluminum.

22. The coordinate measuring equipment according to claim 12, wherein the component to be damped is a portion of a column of a portal of a coordinate measuring equipment.

* * * * *